US009507099B2

(12) United States Patent
Li et al.

(10) Patent No.: US 9,507,099 B2
(45) Date of Patent: Nov. 29, 2016

(54) HIGH DENSITY MULTI-FIBER FERRULE FOR OPTICAL FIBER CONNECTOR

(71) Applicant: NANOPRECISION PRODUCTS, INC., El Segundo, CA (US)

(72) Inventors: Shuhe Li, Pasadena, CA (US); Robert Ryan Vallance, Newbury Park, CA (US); Michael K. Barnoski, Pacific Palisades, CA (US); Gregory L. Klotz, La Verne, CA (US)

(73) Assignee: NANOPRECISION PRODUCTS, INC., El Segundo, CA (US)

( * ) Notice: Subject to any disclaimer, the term of this patent is extended or adjusted under 35 U.S.C. 154(b) by 0 days.

(21) Appl. No.: 13/650,099

(22) Filed: Oct. 11, 2012

(65) Prior Publication Data

US 2013/0266271 A1    Oct. 10, 2013

Related U.S. Application Data

(60) Provisional application No. 61/620,945, filed on Apr. 5, 2012.

(51) Int. Cl.
*G02B 6/36* (2006.01)
*G02B 6/38* (2006.01)

(52) U.S. Cl.
CPC .............. *G02B 6/3882* (2013.01); *G02B 6/36* (2013.01); *G02B 6/3839* (2013.01); *G02B 6/3885* (2013.01)

(58) Field of Classification Search
CPC ................ G02B 6/3833–6/3839; G02B 6/40; G02B 6/3885
USPC ........................ 385/83, 76–78, 53–55, 60, 65
See application file for complete search history.

(56) References Cited

U.S. PATENT DOCUMENTS

| 3,864,018 | A | * | 2/1975 | Miller .............................. 385/98 |
| 4,046,454 | A | * | 9/1977 | Pugh, III ......................... 385/59 |
| 4,818,059 | A | | 4/1989 | Kakii et al. |
| 4,973,127 | A | * | 11/1990 | Cannon et al. ................. 385/56 |

(Continued)

FOREIGN PATENT DOCUMENTS

| CH | 676513 | 1/1991 |
| EP | 0782022 | 7/1997 |

(Continued)

OTHER PUBLICATIONS

International Search Report of Counterpart PCT International Application No. PCT/US2012/059831.

*Primary Examiner* — Ellen Kim
(74) *Attorney, Agent, or Firm* — Liu & Liu

(57) ABSTRACT

A ferrule for a high density optical fiber connector, supporting a first set of optical fibers of a first fiber cable and a second set of optical fibers of a second fiber cable. The ferrule supports the first and second sets of optical fibers in at least one plane. In one embodiment, the first set of optical fibers are supported in a first row of open grooves, and the second set of optical fibers are supported in a second row of open grooves. The optical fibers in the first row are staggered with respect to the optical fibers of the second row. The ferrule comprises two halves, each having an open structure that has a row of open grooves precisely formed thereon in a plane. In another embodiment, the ferrule supports the first and second sets of optical fibers in a single row, in an alternating interleaving manner.

21 Claims, 10 Drawing Sheets

(56) References Cited

U.S. PATENT DOCUMENTS

| | | | |
|---|---|---|---|
| 5,214,730 A | 5/1993 | Nagasawa et al. | |
| 6,321,019 B1 | 11/2001 | Shibuya et al. | |
| 6,345,916 B1 | 2/2002 | Yui et al. | |
| 6,364,539 B1 * | 4/2002 | Shahid | 385/83 |
| 6,480,220 B1 * | 11/2002 | Tamaki | 347/242 |
| 6,550,980 B2 * | 4/2003 | Schofield et al. | 385/83 |
| 6,726,372 B1 * | 4/2004 | Sherrer et al. | 385/83 |
| 6,742,937 B2 * | 6/2004 | Lee et al. | 385/78 |
| 6,817,777 B1 * | 11/2004 | Grabbe | 385/59 |
| 7,103,256 B2 * | 9/2006 | Song et al. | 385/137 |
| 7,311,449 B2 | 12/2007 | Barnoski et al. | |
| 2002/0146216 A1 | 10/2002 | Schofield et al. | |
| 2003/0091297 A1 | 5/2003 | Hung et al. | |

FOREIGN PATENT DOCUMENTS

| | | |
|---|---|---|
| EP | 1176441 | 1/2002 |
| EP | 1338908 | 8/2003 |
| EP | 2063301 | 5/2009 |
| FR | 2268370 | 11/1975 |
| JP | S5685718 | 7/1981 |
| JP | H05134146 | 5/1993 |
| WO | 02/082143 | 10/2002 |

* cited by examiner

//HIGH DENSITY MULTI-FIBER FERRULE FOR OPTICAL FIBER CONNECTOR

PRIORITY CLAIM

This application claims the priority of U.S. Provisional Patent Application No. 61/620,945 filed on Apr. 5, 2012, which is fully incorporated by reference as if fully set forth herein. All publications noted below are fully incorporated by reference as if fully set forth herein.

BACKGROUND OF THE INVENTION

1. Field of the Invention

The present invention relates to optical fiber connectors, in particular ferrules in optical fiber connectors.

2. Description of Related Art

There are many advantages of transmitting light signal via optical fiber waveguides and the use thereof is diverse. Single or multiple fiber waveguides may be used simply for transmitting visible light to a remote location. Complex telephony and data communication systems may transmit multiple specific optical signals. These devices couple fibers in an end-to-end relationship, with the coupling being one source of light loss. Precision alignment of two polished ends of fibers is needed to ensure that overall optical loss in a fiber link is equal or less than the specified optical connector loss budget for a system. For single-mode telecommunication-grade fiber, this typically corresponds to connector fiber alignment tolerances that are less than 1000 nm. This means that in both parallel fiber and single fiber links, operating at multi-gigabit rates, the components applied to align the fibers must be assembled and fabricated with sub-micron precision.

In an optical fiber connection, an optical fiber connector terminates the end of a cable that contains one or multiple fibers, and enables quicker connection and disconnection than splicing. The connectors mechanically couple and align the cores of fibers so that light can pass end-to-end. Better connectors lose very little light due to reflection or misalignment of the fibers. Connectors, in both parallel/multiple fiber and single fiber links, operating at multi-gigabit rates must be assembled with subcomponents fabricated with sub micron precision. As if producing parts with such precision levels were not challenging enough, for the resulting end product to be economical it must be done in a fully automated, very high-speed process.

Current optical fiber connectors have not changed in basic design for many years. The basic connector unit is a connector assembly. FIG. 1 illustrates an example of an optical fiber connector 400 for a cable 410 containing optical fibers 412, which is commercialized by US Conec Ltd. The connector includes an assembly of components consisting of a ferrule 402, a ferrule housing 404, a cable jacket or boot 406, alignment guide pins 408, and other hardware provided within or outside the housing (e.g., cable strain relief, crimp, biasing spring, spacer, etc.). The ferrule 402 and the terminating end faces of the fibers 412 are polished. The ferrule 402 in the optical fiber connector 400 is spring-loaded to provide an axial bias to press together the polished end faces of the fibers in two connectors in an end-to-end configuration. In most cases, the intent is to establish physical contact between coupled fibers to prevent loss of light. Physical contact avoids a trapped layer of air between two fibers, which increases connector insertion loss and reflection loss. An adaptor, not shown, is required to securely couple the ferrules of two connectors (the ferrule housing 404 of each connector is plugged into the adaptor).

The optical fiber connector illustrated in FIG. 1 manufactured by US Conec Ltd. is purportedly in accordance with the structure disclosed in U.S. Pat. No. 5,214,730, which is assigned to Nippon Telegraph and Telephone Corporation. As illustrated in the '730 patent, the optical fiber connector receives a optical fiber ribbon cable having a plurality of individual optical fibers and maintains the individual optical fibers in a predetermined relationship. The optical fiber connector can be mated with another optical fiber connector (e.g., using an adaptor) so as to align the plurality of individual optical fibers of one optical fiber connector with the plurality of optical fibers of the other optical fiber connector.

The ferrule 402 from US Conec Ltd. is generally in the form of a plastic block having a series of over-sized throughholes that provide sufficient clearance for inserting the terminating ends of optical fibers 412 and alignment pins 408 into the block. The ferrule 402 is formed by molding of a plastic polymer that is often reinforced by glass particles. To insert the terminating ends of the multiple optical fibers 412 through the holes in the ferrule block 402, the protective jacket and buffer (resin) layers of the optic fiber are stripped off to expose the cladding layer near the terminating ends, and the cladding layer is coated with a layer of epoxy. The terminating ends of the optical fibers are then threaded into the over-sized holes in the ferrule. The ends of the optical fibers 412 are securely held in the ferrule 402 upon curing of the epoxy. Similarly, the alignment pins 408 are retained with epoxy after inserting into the oversized holes in the ferrule 402 provided for the pins.

The above described ferrule has several significant drawbacks. The injection molded structure inherently does not hold tolerance well. The polymer is not rigid and deforms when loads (forces or moments) are applied to the fiber cable or connector housing. Polymers are also susceptible to creep and thermal expansion/contraction over longer periods of time. The clearance in the over-sized holes in the ferrule further affects tolerance of end-to-end alignment of fibers. The epoxy shrinks upon curing, which leads to bending of the plastic ferrule. Further, epoxy creeps over time, leading to pistoning or retracting of the optical fiber ends (which are pushed against the ends of adjoining fibers) within the holes in the ferrule under the applied axial bias of the spring-load in the connector. This compromises the integrity of the surface contact interface of opposing fiber end faces. These and other deficiencies result in poor resultant tolerance that is more to be desired for modern day optical fiber applications.

Currently, it is generally accepted that fiber connectors cost too much to manufacture and the reliability and loss characteristics are more to be desired. The tolerance of the fiber connectors must improve, and the cost of producing fiber connectors must decrease if fiber optics is to be the communication media of choice for short haul and very short reach applications. The relatively widespread and ever increasing utilization of optical fibers in communication systems, data processing and other signal transmission systems has created a demand for satisfactory and efficient means of inter-joining fiber terminals.

Further, with increasing demand for high capacity optical fiber transmissions, multiple strands of optical fibers are bundled in a cable (e.g., 410 in FIG. 1) and many cables each having multiple optical fibers are routed through an optical fiber network. Heretofore, multi-fiber connectors such as that shown in FIG. 1 have optical fibers terminating in a row in a single plane. The optical fibers terminating in a connector are part of and extend from a single optical fiber cable. The optical fibers 412 are individually received in separate holes in the ferrule block 402, wherein adjacent optical fibers from the same fiber bundle or cable are separated within the ferrule block 402. Consequently, the number of holes provided in the ferrule 412 limits the density of inter-joining fiber terminals per fiber connector 400. As one can appreciate, for a larger number of inter joining fiber terminals at a coupling location in the network, a larger optical fiber connector having a larger footprint and/or a larger number of fiber connectors 400 are required. Larger connection and additional fiber connectors 400 at a coupling location result in bulk that takes up more space at the connection location, which could be disproportionate to the size of the optical fiber cable 410. Furthermore, termination and cabling costs increase when multiple connectors are necessary.

Heretofore, U.S. Conec Ltd. supplies molded ferrules that support an array of optical fibers. Ferrules are available with up to 6 rows of 12 fibers for a total 72 fibers of a single fiber cable. However, such ferrules possess the same deficiencies noted for molded ferrules that support a linear array of fibers noted above. It becomes more difficult to hold the required tolerances for molded ferrules. In fact, the 72-fiber ferrule is only available for multi-mode fiber due to poor tolerances. Further, the arrays of holes in ferrule blocks are not conducive to forming by stamping processes.

It is therefore desirable to develop a new high density optical fiber connector design, and in particular a new high density ferrule design, which can accommodate a significantly higher density of optical fibers, which results in low insertion loss and low return loss, which provides ease of use and high reliability with low environmental sensitivity, and which can be fabricated at low cost.

SUMMARY OF THE INVENTION

The present invention provides a ferrule for an optical fiber connector, which overcomes many of the drawbacks of the prior art ferrules and connectors. The ferrule in accordance with the present invention provides an optical fiber connector, which can accommodate a significantly higher density of optical fibers, which results in low insertion loss and low return loss, which provides ease of use and high reliability with low environmental sensitivity, and which can be fabricated at low cost. In accordance with the present invention, the density of terminating optical fibers in a fiber connector may be significantly increased (e.g., doubled) for a given width or footprint of the ferrule. In one aspect, the inventive ferrule supports optical fibers extending from one or more optical fiber cable (e.g., ribbon shaped or rounded cables). In one embodiment, the ferrule is structured for accommodating multiple optical fibers bundled in separate optical fiber cables.

In accordance with the present invention, the ferrule is provided with fiber grooves and alignment pin grooves that are open channels, as compared to through-holes in a ferrule block (e.g., a molded ferrule block). This avoids the need to insert optical fibers and alignment pins in holes with additional clearance as was practiced in the prior art. By providing open channels for the fibers and alignment pins, no clearance needs to be provided for the fibers and alignment pin. By not having any clearance between the grooves in the ferrule and the fibers and alignment pins which would otherwise lead to movements between the parts, the alignment pins and the fibers can be more accurately located relative to each other. The spacing of the fibers and pins can be better maintained under changes in environmental conditions, for example, as the ferrule can accommodate more dimensional variations without affecting specified alignment tolerances. The optical fiber connector thus formed results in low insertion loss and low return loss. The ferrule configuration also allows ease of attaching terminating fiber ends to the ferrules, compared to threading epoxy coated fibers through holes in prior art ferrules. Without using epoxy, the reliability of the optical fiber connector is not affected by any aging/creeping of epoxy material. By selecting appropriate materials for the ferrule, the performance of the optical fiber connector is less sensitive to thermal variations. The open structure of the ferrule lends itself to mass production processes such as stamping and extrusion, which are low cost, high throughput processes.

In one embodiment of the present invention, a first set of terminating optical fibers (e.g., of a first fiber cable) are supported in a first row of open fiber grooves, and a second set of terminating optical fibers (e.g., of a second fiber cable) are supported in a second row of open fiber grooves, with the first row parallel to the second row. In one embodiment, the optical fibers in the first row are staggered with respect to the optical fibers of the second row.

In one embodiment, the ferrule comprises two halves, each having an open structure that has a row of open grooves precisely formed thereon in a plane. The two ferrule halves are stacked, with the rows of grooves parallel to each other. Each row of grooves in a ferrule half accommodates the optical fibers of an optical fiber cable. In one embodiment, the grooves are configured to be open fiber clamping grooves, which can securely clamp the optical fibers without the need for epoxy or a complementary precision part. In one embodiment, at least a section of the longitudinal opening of the groove is provided with opposing lips to provide a clamping effect. The width of the longitudinal opening defined between the lips along at least a section of the grooves is narrower than the diameter of the optical fibers to create a tight fit (e.g., an interference fit) with respect to the fibers, which allows the end section of an optical fiber to be inserted laterally into the longitudinal opening of groove, but which snuggly retains the optical fiber in the groove. The grooves and the width of the longitudinal groove openings are shaped and sized to retain the fibers without any clearance to allow for movement of the fiber relative to the groove.

In another embodiment of the present invention, the ferrule is configured to align the terminating optical fibers in a row in a plane, whereby the axis of adjacent optical fibers are spaced at a distance substantially corresponding to the diameter of the optical fibers. In one embodiment, the terminating optical fibers are arranged side-by-side in a row within a plane in the ferrule, with adjacent optical fibers touching each other. In one embodiment, in the row of terminating optical fibers, optical fibers of two different optical fiber cables are alternately arranged in a staggered and interleaved manner. In one embodiment, the ferrule is provided with at least a single wide opening that receives and accommodates the optical fibers in the side-by-side touching configuration. There may be more than one opening, each receiving and accommodating a set of optical fibers in a row within a plane. In another embodiment, the terminating optical fibers are arranged in more than one row within a ferrule/connector.

In another aspect of the present invention, the inventive ferrules are precision formed by high throughput processes, such as stamping and extrusion.

In one embodiment, the ferrule body is made of a metal material, which may be chosen to have high stiffness (e.g., stainless steel), chemical inertness (e.g., titanium), high temperature stability (nickel alloy), low thermal expansion (e.g., Invar), or to match thermal expansion to other materials (e.g., Kovar for matching glass).

The ferrule in accordance with the present invention overcomes many of the deficiencies of the prior art, resulting in a high density optical fiber connector that results in low insertion loss and low return loss, which provides ease of use and high reliability with low environmental sensitivity, and which can be fabricated at low cost.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENTS

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

The present invention provides a ferrule for an optical fiber connector, which overcomes many of the drawbacks of the prior art ferrules and connectors. The ferrule in accordance with the present invention provides an optical fiber connector having an optical fiber ferrule, which can accommodate a significantly higher density of optical fibers, which results in low insertion loss and low return loss, which provides ease of use and high reliability with low environmental sensitivity, and which can be fabricated at low cost.

In accordance with the present invention, the density of terminating optical fibers in a fiber connector may be significantly increased (e.g., doubled) for a given width or footprint of the ferrule. The inventive ferrule supports optical fibers extending from one or more than one optical fiber cable (e.g., ribbon shaped or rounded cables). The ferrule is structured for accommodating multiple optical fibers bundled in the same or separate optical fiber cables. In one embodiment of the present invention, a second set of terminating optical fibers of a first fiber cable are arranged in a first row of open grooves, and a first set of terminating optical fibers of a second fiber cable are arranged in a second row of open grooves, with the first row parallel to the second row. In one embodiment, the optical fibers in the first row are staggered with respect to the optical fibers of the second row. One embodiment of the present invention is illustrated in FIGS. 2-6.

Figure 1:
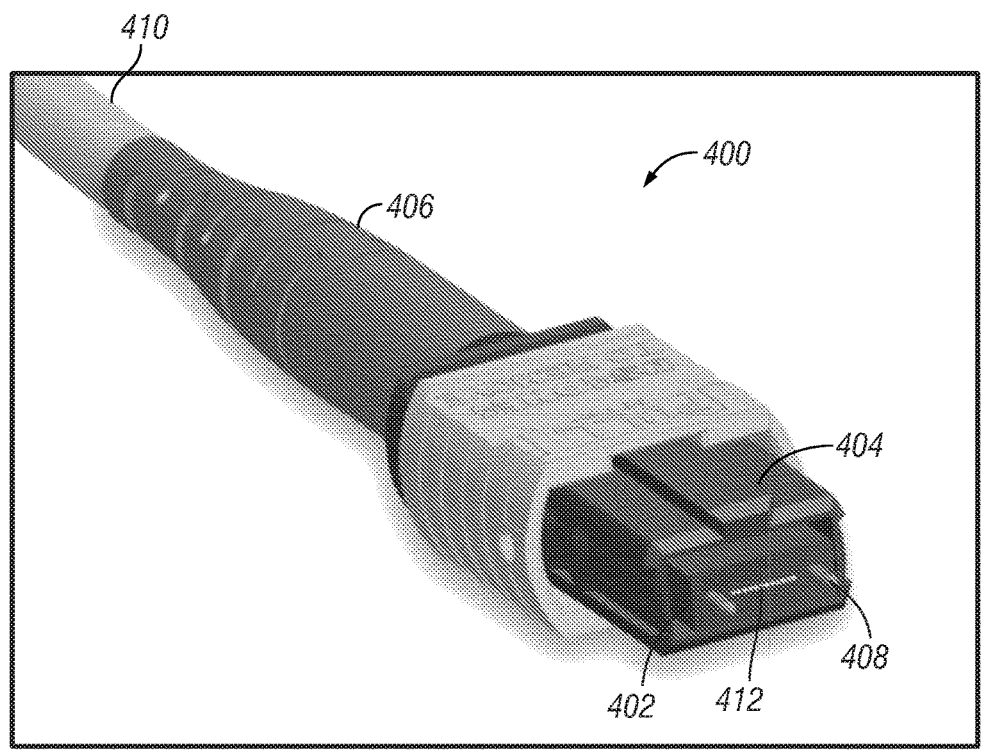
FIG. 1 illustrates a prior art optical fiber connector.
Figure 2:
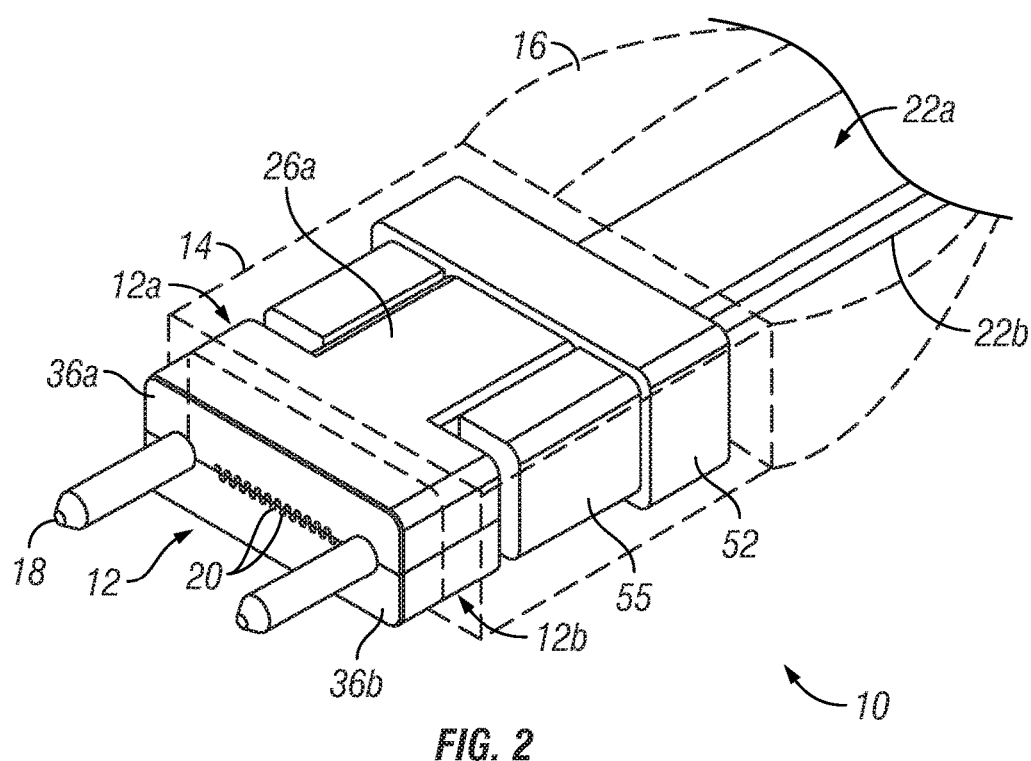
FIG. 2 illustrates a perspective view of a high density optical fiber connector in accordance with one embodiment of the present invention.

FIG. 2 illustrates a perspective view of an optical fiber connector 10 having an assembly of components including a ferrule 12 in accordance with one embodiment of the present invention. The connector 10 further includes a ferrule housing 14 (shown in dotted lines), a cable boot 16 (shown in dotted lines), and alignment guide pins 18. FIG. 2 is a simplified illustration of the optical fiber connector 10. Other than the ferrule 12 that is structured in accordance with the present invention, the other components of the optical fiber assembly 10 may further include those found in the optical fiber assembly shown in FIG. 1 (i.e., the ferrule in accordance with the present invention may be made backward compatible to be used in MTO/MPO optical fiber connectors as offered by US Conec Ltd.). FIGS. 3-6 are various views of the optical fiber connector 10, with the ferrule housing 14 and cable boot 16 omitted from view.

In the illustrated embodiment, the ferrule 12 comprises two ferrule halves 12a and 12b. The ferrule halves 12a and 12b are identical in structure in the illustrated embodiment. This facilitates inventory of identical components. However, the ferrule halves need not be identical, as long as they are capable of being mated together to support the optical fibers 20a and 20b.

Figure 4:
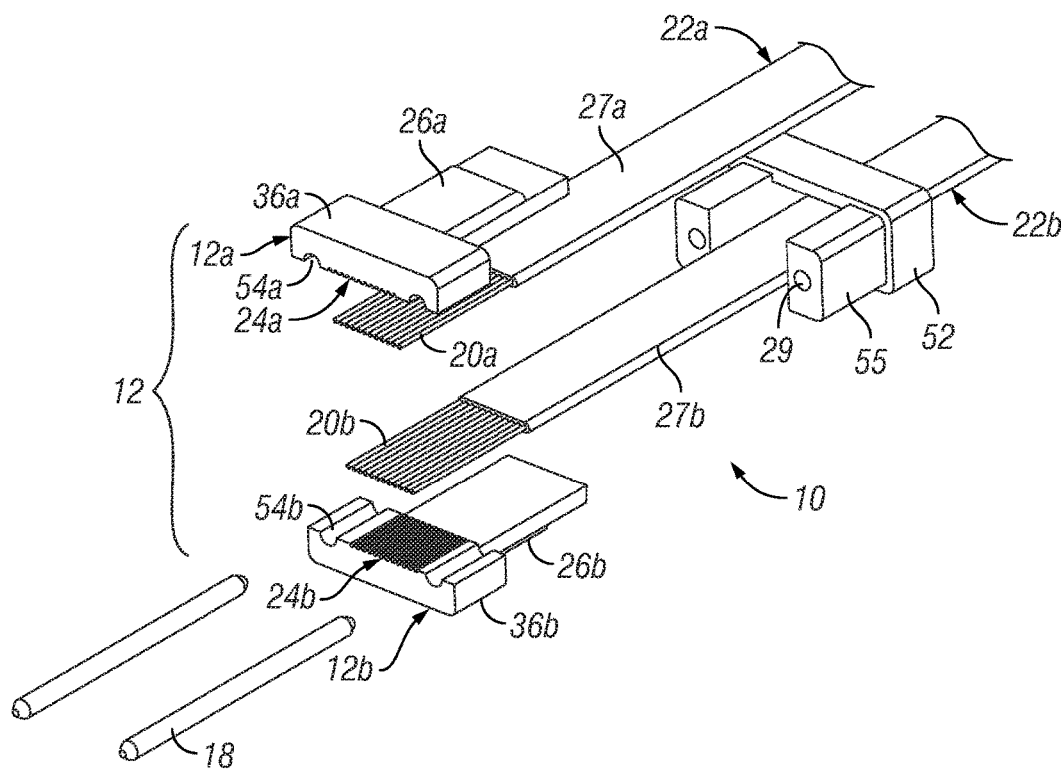
FIG. 4 is an exploded view of the optical fiber connector in FIG. 2.
Figure 5:
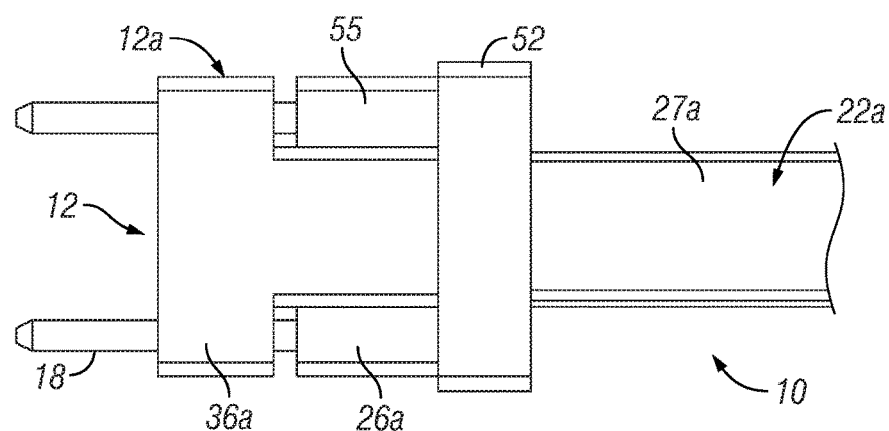
FIG. 5 is a top view of the optical fiber connector in FIG. 2.
Figure 6:
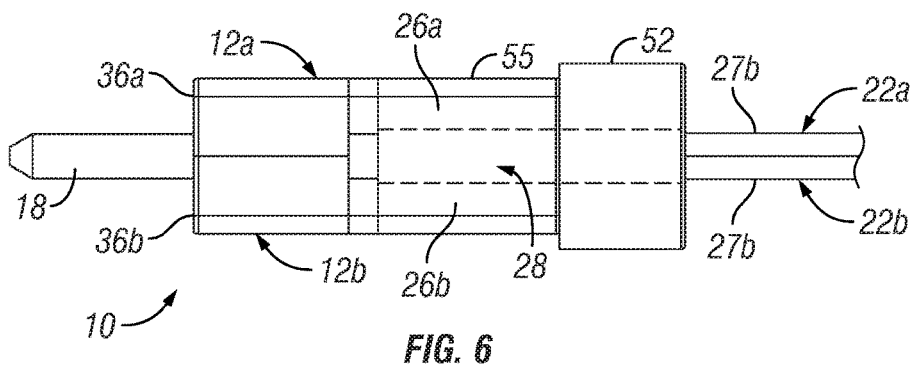
FIG. 6 is a side view of the optical fiber connector in FIG. 2.

Referring also to FIG. 4, each ferrule halves (12a, 12b) has a generally T-shaped structure, including a head section (36a, 36b) and a tail section (26a, 26b). The head sections (36a, 36b) each has an open structure that has a row of open grooves (24a, 24b) precisely formed thereon in a plane. The two ferrule halves 12a and 12b are stacked, with the head sections (36a, 36b) mated together, and the rows of grooves 24a and 24b are parallel to each other. Each row of open grooves (24a, 24b) of a ferrule halve (12a, 12b) accommodates the optical fibers of a separate optical fiber cable (22a, 22b).

In the illustrated embodiment, twelve optical fibers 20a are held within a jacket 27a to form a first optical ribbon fiber cable 22a, and twelve optical fibers 20b are held within a jacket 27b to form a second optical ribbon fiber cable 22b (see also FIG. 2). The terminating optical fibers 20a of the first optical fiber cable 22a are received in a first row of longitudinal open grooves 24a in the head section 36a of the first ferrule halve 12a, and the terminating optical fibers 20b of a second fiber cable 22b are received in a second row of longitudinal open grooves 24b in the head section 36b of the second ferrule halve 12b, with the first row parallel to the second row. The grooves (24a, 24b) receive the terminating end sections of the optical fibers (20a, 20b) in their bare form with cladding exposed, without protective buffer and jacket layers.

Figure 3:
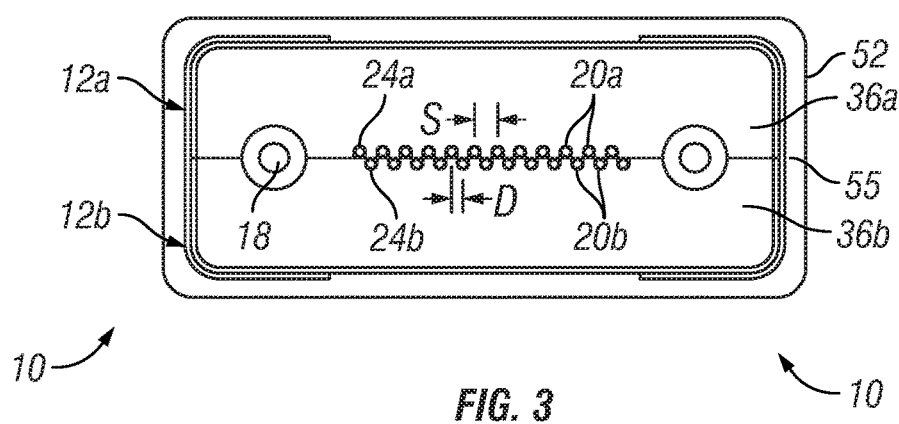
FIG. 3 is an end view of the optical fiber connector in FIG. 2.

The configuration of the rows of grooves is more clearly seen from the end view of the ferrule 12 in FIG. 3. In the illustrated embodiment, each groove has a substantially U-shaped cross-section with substantially parallel sides. The head sections 36a and 36b of the ferrule halves 12a and 12b are mated with the grooved surfaces facing towards each other. The grooves 24a and 24b are staggered, such that optical fibers 20a in the first row are staggered with respect to the optical fibers 20b in the second row. In particular, the longitudinal openings of the grooves 24a in the head section 36a of the first ferrule halve 12a each faces a longitudinal flat portion 13b (or partition) that separates adjacent grooves 24b defined in the head section 36b of the second ferrule halve 12b, and the longitudinal openings of the grooves 24b in the head section 36b of the second ferrule halve 12b each faces a longitudinal flat portion 13a that separates adjacent grooves 24a defined in the head section 36a of the first ferrule halve 12a. The depth of the grooves is sized to completely receive the optical fibers. In the illustrated embodiment, the depth of the grooves is at least D (e.g., 125 µm), the diameter of the bare section of the optical fibers, with cladding exposed, without protective buffer and jacket layers, as referenced throughout herein. Each flat portion (13a, 13b) substantially covers the corresponding opposing groove opening. In the illustrated embodiment, each portion (13a, 13b) completely covers the corresponding opposing groove opening.

The lateral centerline spacing S of adjacent grooves of a ferrule halve is equivalent to the width of a groove plus the width of a separating flat portion (13a, 13b). In the illustrated embodiment, the width of a flat portion (13a, 13b) is substantially similar to the width of the U-shaped grooves, which substantially corresponds to the diameter D of bare sections of optical fibers. Accordingly for the embodiment illustrated in FIG. 3, the lateral (in the direction along the plane of the interface between the two ferrule halves) centerline spacing between adjacent grooves 24a and 24b are substantially equivalent to diameter D of a bare optical fiber (20a and 20b), and the lateral centerline spacing S is substantially equivalent to 2D.

The flat portions (13a, 13b) of one head section (36a, 36b) serve to cap the openings in the grooves (24a, 24b) of the other head section. With the depth of the grooves being substantially D, each flat portion (13a, 13b) and its corresponding opposing groove together define a space that precisely positions the optical fibers (20a, 20b).

The width of the longitudinal opening defined between the walls along at least a section of the grooves is slightly narrower than the diameter of the bare optical fibers to create a tight fit (e.g., an interference fit of 1 µm) with respect to the bare fibers (bare sections with cladding exposed, without protective buffer and jacket layers), which allows the end section of an optical fiber to be inserted laterally into the longitudinal opening of groove, but which snuggly retains the optical fiber in the groove. The grooves and the width of the longitudinal groove openings are shaped and sized to retain the fibers without any clearance to allow for movement of the fiber relative to the groove. The grooves may have a rounded bottom to conform to the external shape of the optical fiber, or a flat bottom or a v-groove (thus resulting in spaces between the fiber and the wall of the groove). The rounded bottom is preferable since it increases the contact area with the fiber and provides more uniform elastic stress within the fiber. The use of a groove with an interference fit contrasts with that of the molded ferrule as shown in FIG. 1, which has a hole that is toleranced to be larger than the diameter of the optical fiber. Consequently, the oversized hole does not govern the position of the optical fiber.

The tail sections (26a, 26b) of the ferrule halves 12a and 12b are thinner than the head sections (36a, 36b). The facing sides of the tail sections (26a, 26b) together define a recess 28 there-between, which is sized to receive and clamp the jackets 27a and 27b between the ferrule halves 22a and 22b when they are mated together in the configuration illustrated in FIG. 2. The jackets 27a and 27b of the fiber ribbon 22a and 22b are fitted within the recess 28, which provides additional room to accommodate the thickness of the jackets (27a, 27b) and the protective buffer and jacket layers on the fibers 20 within the jackets (27a, 27b). The outsides of the ends of the tail sections (26a, 26b) are thinned, to fit into a collar 52, thereby clamping the jackets (27a, 27b). The collar 52 and the tail sections (26a, 26b) together provide strain relief on the fiber cables (22a, 22b). The alignment pins 18 are supported by the through-holes defined by the open grooves (54a, 54b) at the head sections (36a, 36b) and holes 29 provided at the stubs 55 on the collar 52. The collar 52 maintains the head sections (36a, 36b) of the ferrule halves (12a, 12b) in a mating configuration. The collar 52 may be deemed a component part of the ferrule 12.

It is noted that the collar 52 may be omitted, and the head sections of the ferrule halves can be maintained in a mating configuration by laser welding, for example.

Given that the optical fibers (20a, 20b) are completely retained in the grooves (24a, 24b), the optical fibers (20a, 20b) are positioned with precision in the ferrule halves (12a, 12b) by the grooves (24a, 24b). The position and orientation of the optical fibers (20a, 20b) is set by the location and parallelism of the grooves (24a, 24b). Accordingly, the relative locations (e.g., spacing) of the optical fibers (20a, 20b) in the ferrule halves (12a, 12b) are precisely maintained within the ferrule, e.g., for alignment to fibers in an opposing optical fiber connector (which has a female structure to receive the alignment pins 18). No complementary ferrule would be required to securely and precisely position the fibers within the optical fiber connector. Even though complementary ferrule halves do not serve any alignment function or effective support to position the fibers 20b in the ferrule halve 12b, and vice versa, however, by providing two ferrule halves 12a and 12b each having the above groove clamping structure, the ferrule halves 12a and 12b together form a ferrule 12 that accommodates a high fiber density.

In another aspect of the present invention, the fiber grooves of the above-disclosed embodiment are precision formed by high throughput processes, such as stamping and extrusion.

In one embodiment, the ferrule body is made of a metal material, which may be chosen to have good thermal dimensional stability (e.g., Invar).

One can appreciate instead of ribbon cables, the optical fibers may be bundled in the form of rounded fiber cables, without departing from the scope and spirit of the present invention.

Figure 7:
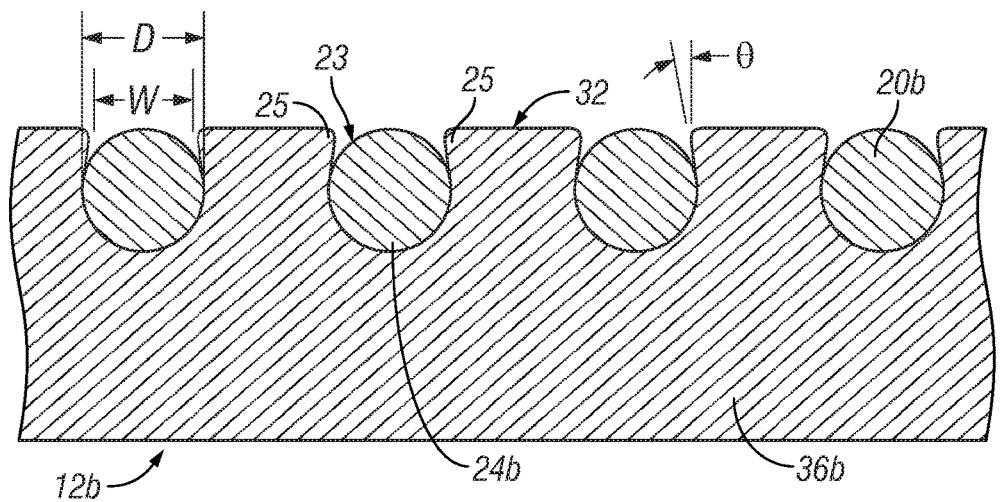
FIG. 7 is a sectional view of a portion of the lower ferrule halve, in accordance with another embodiment of the present invention.
Figure 8:
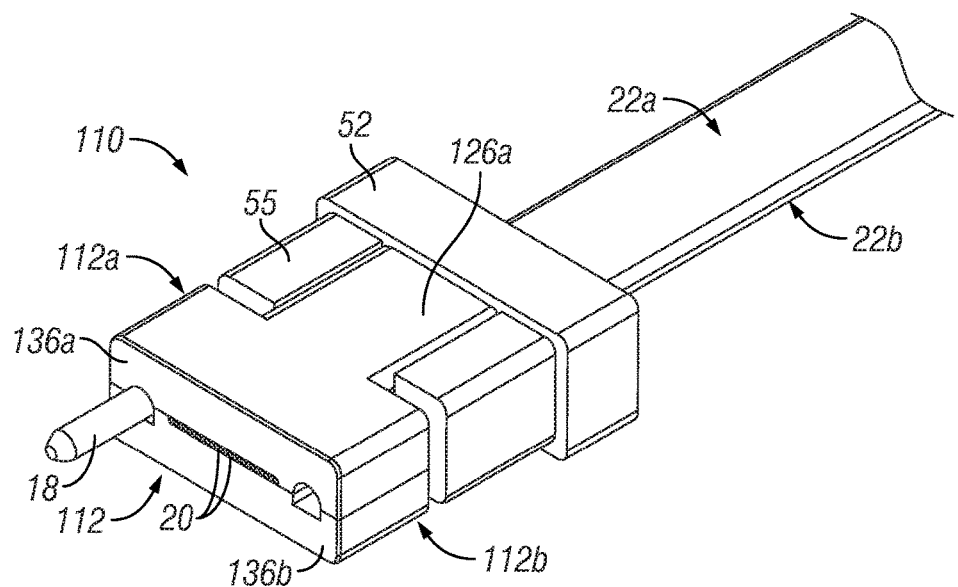
FIG. 8 illustrates a perspective view of a high density optical fiber connector in accordance with a further embodiment of the present invention.
Figure 9:
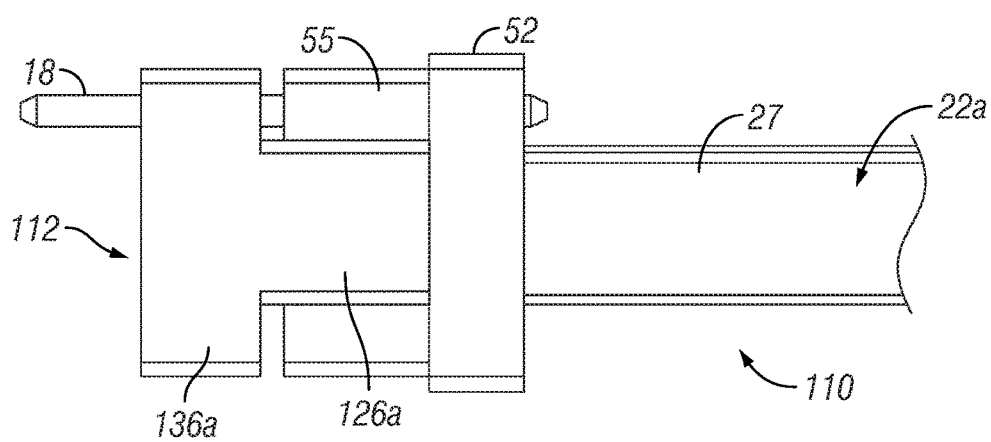
FIG. 9 is a top view of the optical fiber connector in FIG. 8.
Figure 10:
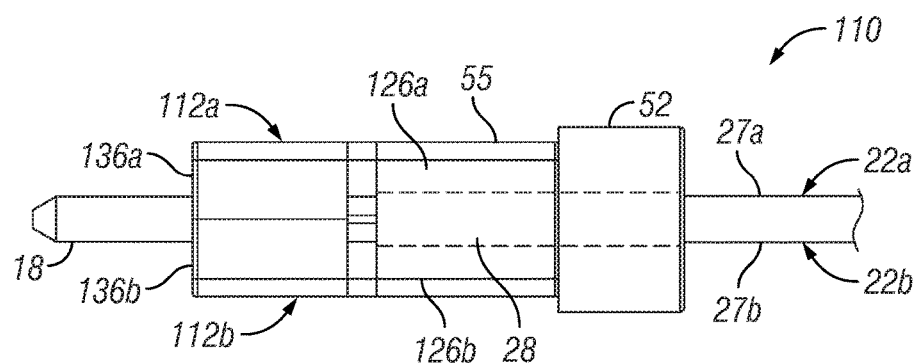
FIG. 10 is a side view of the optical fiber connector in FIG. 8.

In another embodiment of the present invention, the ferrule comprises ferrule halves that have an open structure with precision groove clamping features formed thereon, which can securely hold optical fibers without the need for epoxy or a complementary precision part. FIG. 7 illustrates a section of the grooves 24b in the head section 36b of the ferrule halve 12b. The ferrule halve 12a can have a similar groove structure.

The grooves 24b are structured to securely retain the fibers 20b (bare sections with cladding exposed, without protective buffer and jacket layers) by an opening that clamps the fibers 20b, e.g., by interference fit (or press fit). The interference fit assures that the fibers 20b are clamped in place and consequently the position and orientation of the fibers is set by the location and parallelism of the grooves 24. The use of an interference fit contrasts with that of the molded ferrule as shown in FIG. 1, which has a hole that is toleranced to be larger than the diameter of the optical fiber. Consequently, the oversized hole does not govern the position of the optical fiber.

In the embodiment illustrated in FIG. 7, the width W of the longitudinal opening 23 of the grooves 24b is made slightly narrower than the diameter of the optical fibers 20b. In particular, the opening 23 is defined by lips 25 formed at the opposing longitudinal edges of the longitudinal opening 23. The width W of the longitudinal openings 23 is slightly under-sized to allow the terminating end section of the optical fibers to be inserted laterally into the longitudinal openings 23 of the grooves with an interference fit. The magnitude of interference can be set by the manufacturing process so that loading the fiber into the groove causes only elastic deformation or minor plastic deformation in the lip. The grooves should not be plastically deformed; otherwise it will affect the accuracy of the fiber locations.

Specifically, to attach the fibers 20b to the head section 36b of the ferrule 12b, the terminating end section of the fibers 20b are pressed lengthwise into the grooves 24b through the longitudinal openings 23 with a snap action (i.e., not in the axial direction of the grooves), with the tip of the fibers 20b slightly protruding beyond the end face of the head section 36b. Further, the width W of the longitudinal openings 23 and the grooves 24b are sized and shaped to snuggly retain the section of optical fibers 20b in the grooves 24b without providing any clearance for axial and lateral movements of the end face of the fibers relative to the grooves to ensure tight tolerance for optical coupling between end faces of two adjoining fibers. No epoxy would be required for retaining the bare fiber sections in the grooves given the interference along the mating surfaces between the fibers 20b and the grooves 24b.

The embodiment shown in FIG. 7 illustrates the cross-sectional shape of the open grooves 24 generally conforming to the body of the fibers 20b. The fiber 20b is securely "clamped" within the groove 24b, with the lips 25 pressing on the top of the fiber 20b against the bottom and other parts of the groove 24b. In the illustrated embodiment, the wall of the fiber 20b is shown to press against the entire wall of the groove 24b, except near the opening 23. This provides a substantially uniform pressure on substantially the entire circumference of the fiber, which has less effect on the optical signals transmitted through the fiber 20b due to stress-induced changes in fiber or core indices of refraction. However, it is well within the scope and spirit of the present invention to structure the grooves in the ferrule with different cross-sections that would still provide adequate interference fit to securely retain the fibers 20b in the grooves 24b. For example, the grooves may have a flat or curved bottom, curved sidewalls, or flat sidewalls perpendicular or at a slight divergent angle to the flat bottom (e.g., a v-bottom), and inwardly directing lips to define the longitudinal opening of the groove. These groove configurations would result in certain spaces between the curved fiber walls and the flat or curved sidewalls of the groove, but the clamping action by the lips 25 and/or vertical walls of the grooves against the fiber nonetheless would not provide any clearance to allow for movement of the fibers within the groove. The empty spaces may be filled with an additional material such as epoxy for encapsulation purpose, to prevent the entrapment of particles, especially during mechanical polishing of the ferrule end face.

Given that the fiber 20b is completely retained in the groove 24b, and the profile of the groove such as lips 25 and the bottom of the groove dictate the location of the fiber 20b within the groove, the fiber 20b is positioned with precision in the ferrule by the groove. Accordingly, the relative locations (e.g., spacing) of the fibers 20b in the ferrule halve 12b are precisely maintained within the ferrule, e.g., for alignment to fibers in an opposing optical fiber connector (which has a female structure to receive the alignment pins 18).

Similar groove structure can be provided in the head section 36a of the ferrule halve 12a based on the same considerations. Except for the structure of the groove, the structures of the other sections of the ferrule halves 12a and 12b and the other components of the connector 10 remain similar to the embodiment shown in FIG. 2.

As an example and not limitation, in one embodiment, for optical fibers 20b made of silica and having a diameter of 125 μm, in a ferrule made of kovar (54% Fe, 29% Ni, 17% Co) material, the length of the grooves 24b may be 1 to 3 mm, the diameter or width (i.e., the maximum lateral dimension D) of the grooves 24b is 0.124 mm, and the width W of the longitudinal openings 23 is 105 μm. The sidewalls of the groove 23 tilt inward towards the opening 23 at an angle θ of about 5 to 20 degrees with respect to the vertical tangent to the fiber 20b. The interference provided is about 1 μm, appropriate for the silica and kovar material. The silica glass is very high strength in compression, so it will withstand high contact pressures from the interference fit.

For a ferrule having the groove clamping structure in accordance with FIG. 7, no complementary ferrule would be required to securely and precisely position the fibers within the optical fiber connector. Even though complementary ferrule halves do not serve any alignment function or effective support to position the fibers 20b in the ferrule halve 12b, and vice versa, however, by providing two ferrule halves 12a and 12b each having the above groove clamping structure, the ferrule halves 12a and 12b together form a ferrule 12 that accommodates a high fiber density.

It can be appreciated from the foregoing that open channels or grooves can be more easily and precisely formed, compared to forming through-holes in a plastic ferrule block practiced in the prior art, such as the connector shown in FIG. 1. In one embodiment, the grooves are initially formed (e.g., by precision stamping), followed by narrowing of the openings of the grooves, for example, by stamping or punching the top surface of the ferrule body to push the material at the two opposing edges of the opening into the opening in the groove to form a lip, or laser machining to melt the material at the corners of the opening to flow into the opening of the groove to form a lip. In another embodiment, the clamping grooves may be precision formed by extrusion. Further information on the high throughput forming of the clamping grooves shown in FIG. 7 has been disclosed in U.S. patent application Ser. No. 13/440,970, filed Apr. 5, 2012, which was commonly assigned to the assignee of the present invention. This application is fully incorporated by reference as if fully set forth herein.

A precision stamping process and apparatus has been disclosed in U.S. Pat. No. 7,343,770, which was commonly assigned to the assignee of the present invention. This patent is fully incorporated by reference as if fully set forth herein. The process and stamping apparatus disclosed therein may be adapted to precision stamping the ferrules of the present invention.

FIGS. 8-12 illustrate a high density optical fiber connector in accordance with another embodiment of the present invention. With the exception of the ferrule, the general structure of the optical fiber connector 110 in this embodiment is similar to the structure of the optical fiber connector 10 in the embodiment of FIGS. 2-6. The optical fiber connector 110 includes a ferrule 112 comprising two ferrule halves 112a and 112b, a collar 52, a ferrule housing and a cable boot (similar to those shown in FIG. 2 but are omitted from view for simplicity). The structure of the collar 52 is similar to that shown in FIG. 2. The general structure of the ferrule halves 112a and 112b are similar to the T-shaped structure of the ferrule halves 12a and 12b in FIG. 2, except for the fiber grooves.

Figure 11:
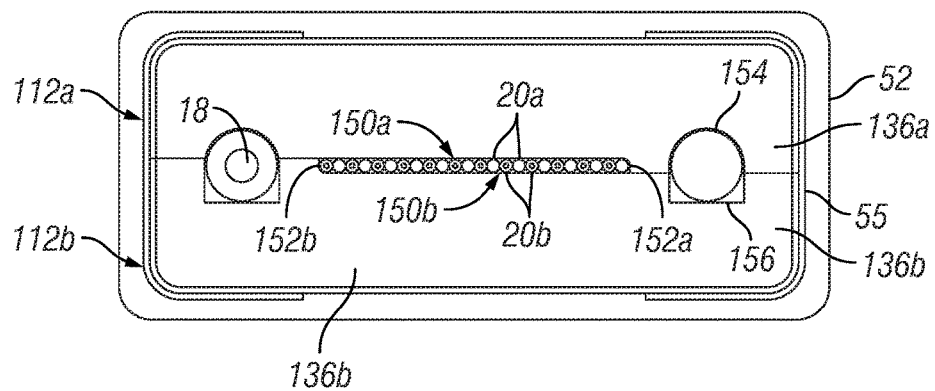
FIG. 11 is an end view of the optical fiber connector in FIG. 8.
Figure 12:
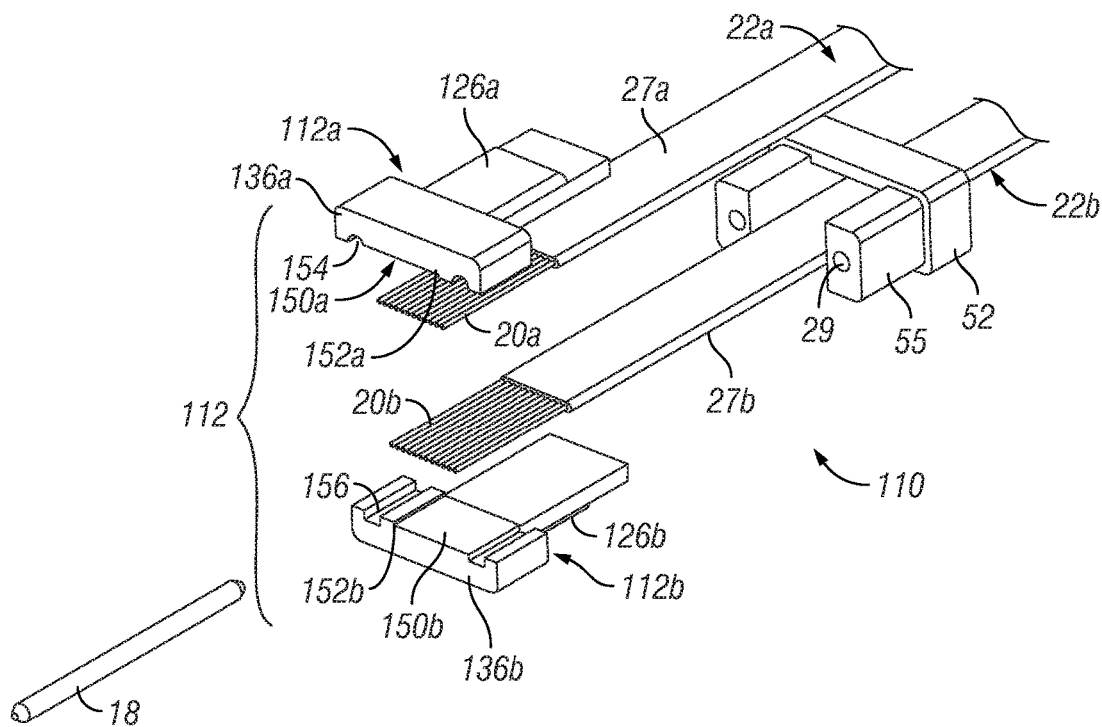
FIG. 12 is an exploded view of the optical fiber connector in FIG. 8.

In this embodiment, the ferrule 112 is configured to align the terminating optical fibers (20a, 20b) of ribbon cables (22a, 22b) in a row in a plane, whereby the axis of adjacent optical fibers (20a, 20b) are spaced at a distance substantially corresponding to the diameter D of the bare optical fibers (without buffer and protective layers, with the cladding exposed). As illustrated in FIG. 11, the terminating optical fibers (20a, 20b) are arranged side-by-side in a row within a plane in the ferrule, with adjacent optical fibers touching each other. The optical fibers 20a and 20b alternately extend from the different optical fiber cables 22a and 22b. In the row of terminating optical fibers, optical fibers 20a alternate with optical fibers 20b in a staggered and interleaved manner. In the illustrated embodiment, the ferrule 112 is provided with at least a single wide flat opening 124 that receives and accommodates the row of optical fibers (20a, 20b) in the side-by-side touching configuration. The wide flat opening 124 is defined by the head sections (136a, 136b) of the complementary ferrule halves 112a and 112b. As more clearly seen in FIG. 11, each head sections (136a, 136b) has a wide flat section (150a, 150b) with a curved lip (152a, 152b) (which combination of structures may be deemed to be an open groove). When the head section 136a of the ferrule halve 112a is mated to the head section 136b of the ferrule halve 112b, the wide flat section 150a is parallel to the flat section 150b, which together defines a space between the flat sections (150a, 150b) within the lips (152a, 152b) to accommodate the row of optical fibers (20a, 20b) in a tight side-by-side configuration. The single flat opening 124 provides a simple structure to precisely align the optical fibers (20a, 20b) in the optical connector 110, by relying on the inherently precise dimension of the optical fibers to provide the needed spatial spacing in the row of optical fibers. Given the flat structure of the flat sections (150a, 150b), the ferrule halves can be more easily precision formed (e.g. by stamping) with tight tolerance. The collar 52 maintains the head sections (136a, 136b) of the ferrule halves (112a, 112b) in a mating configuration. The collar 52 may be deemed a component of the ferrule 112.

In the embodiment shown in FIG. 11, the holes for the alignment pins 18 are defined by a combination of a circular cylindrical open groove provided on one ferrule halve and a square cylindrical open groove provided on the other ferrule halve. In the illustrated embodiment, the ferrule halve 112a is provided with the circular cylindrical groove 154, and the ferrule halve 112b is provided with the square cylindrical groove 156. However, it is within the scope and spirit of the present invention to provide a circular cylindrical groove and a square cylindrical groove on each ferrule halve, so as to provide ferrule halves that are symmetrical and/or identical. The circular cylindrical groove 154 can be precisely formed (e.g., by precision stamping), and the depth of the square cylindrical groove 156 can be precisely formed without requiring precision forming the walls of the square cylindrical groove. Variations in lateral dimension of the square groove 156 do not affect pin alignment. When the head sections (136a, 136b) are mated together, the combination of the precisely defined circular cylindrical walls and the precise depth of the square cylindrical wall accurately and precisely position the alignment pins 18. Similar pin alignment support structure may be provided as in the earlier embodiments of FIGS. 2-6.

Figure 13:
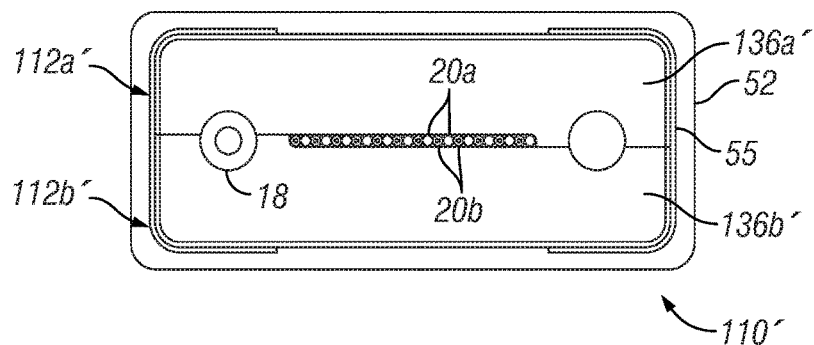
FIG. 13 is an end view of a high density optical fiber connector, in accordance with another embodiment of the present invention with respect to FIG. 8.
Figure 14:
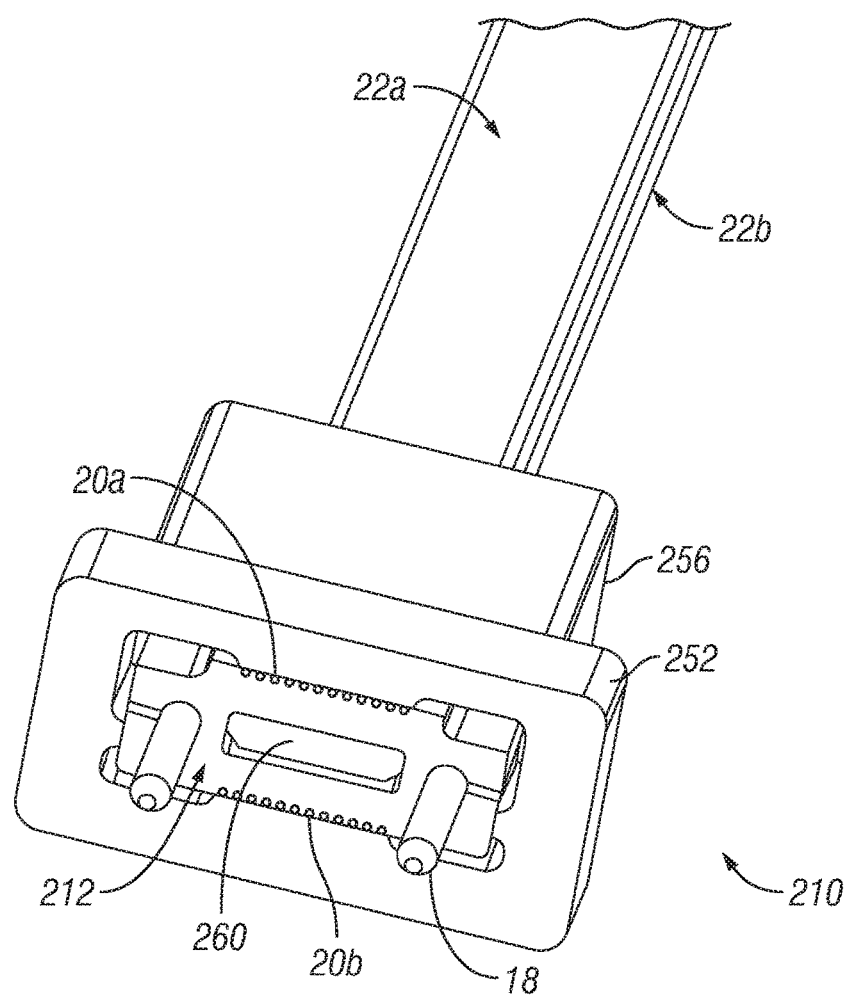
FIG. 14 illustrates a perspective view of a high density optical fiber connector in accordance with yet another embodiment of the present invention.
Figure 15:
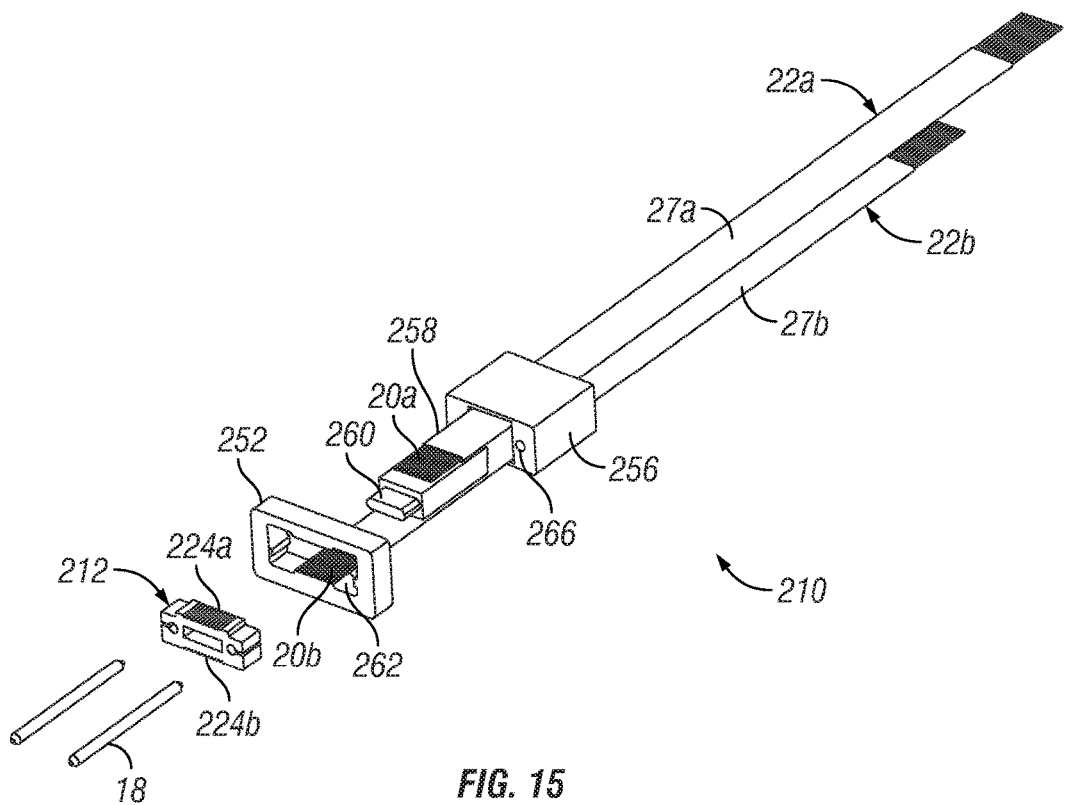
FIG. 15 is an exploded view of the optical fiber connector in FIG. 14.

FIG. 13 illustrates an alternate embodiment of an optical fiber connector 110', in which the holes for alignment pins 18 are defined by the combination of circular cylindrical open grooves provided on the head sections (136a', 136b') of the half ferrules (112a', 112b'). Comparing to FIG. 11, the remaining structures of the optical fiber connector 110' remain similar to the embodiment shown in FIGS. 8-12.

There may be more than one flat opening 124, each receiving and accommodating a set of optical fibers supported in a row within a plane. In another embodiment, the terminating optical fibers are supported in more than one row/layer within a ferrule/connector (not shown), by splitting a ferrule halve into two or more layers.

In an alternate embodiment (not shown), the ferrule halves may be made more symmetrical, wherein each ferrule halve is structured with a head section having a similar slight U-shaped wide trough defined by a wide flat section flanked by a curved lip at each edge. When the ferrule halves are mated, the U-shaped wide troughs of the ferrule halves together define an enclosed space that accommodates a row of staggered/alternating optical fibers (20a, 20b) in a tight side-by-side configuration. The support holes of the alignment pins may also be made symmetrical in this embodiment (e.g., with symmetrical open grooves), or may remain asymmetrical as shown in FIG. 11.

Figure 16:
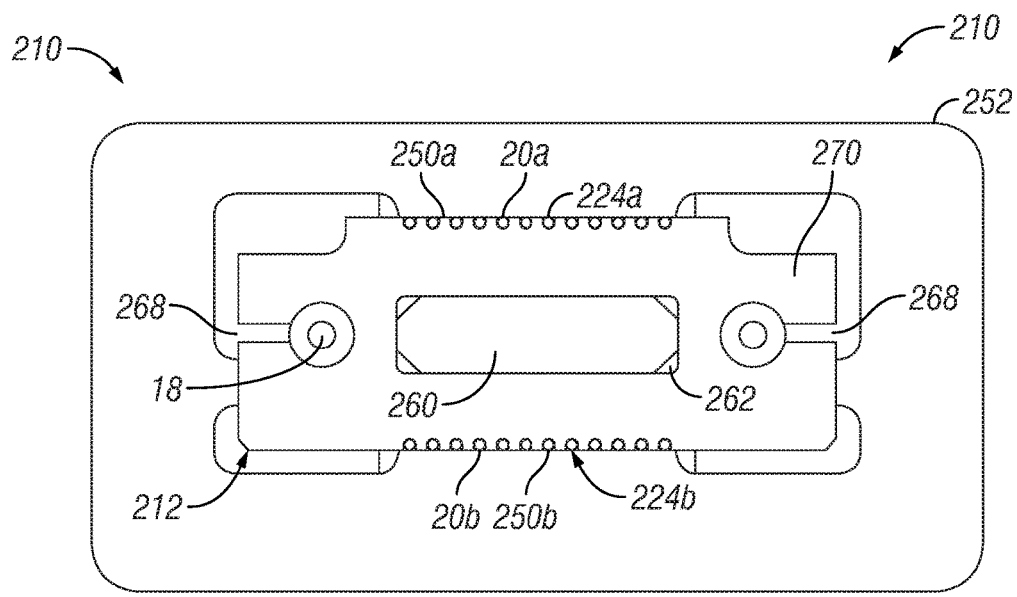
FIG. 16 is an end view of the optical fiber connector in FIG. 14.
Figure 17:
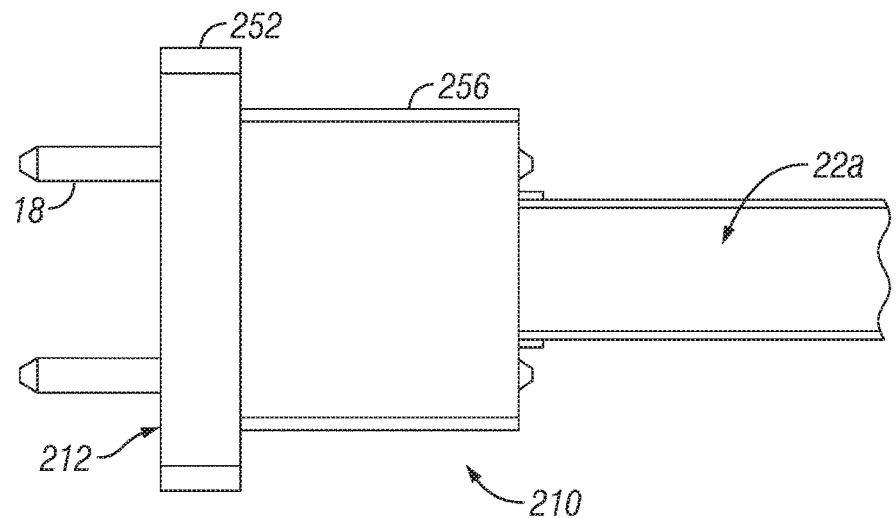
FIG. 17 is a top view of the optical fiber connector in FIG. 14.
Figure 18:
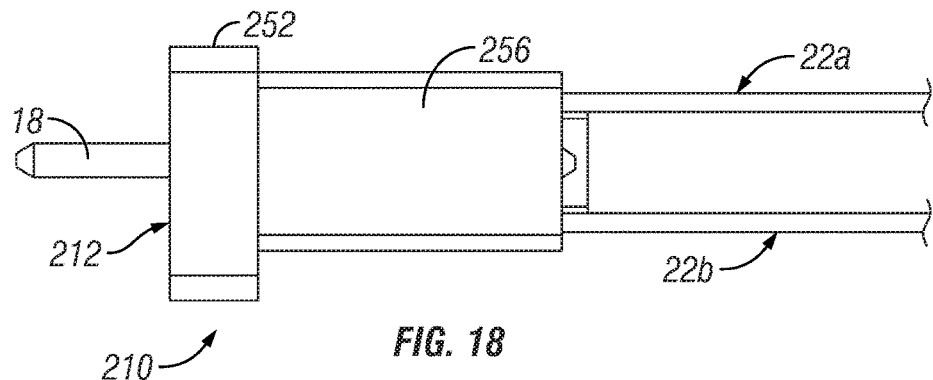
FIG. 18 is a side view of the optical fiber connector in FIG. 14.

FIGS. 14-18 illustrate a high density optical fiber connector in accordance with a further embodiment of the present invention. In this embodiment, the optical fiber connector 210 includes a single piece ferrule 212, a frame 252, a ferrule housing and a cable boot (similar to those shown in FIG. 2 but are omitted from view for simplicity). In this embodiment, the ferrule 112 is configured to align the terminating optical fibers (20a, 20b) of ribbon cables (22a, 22b) in two rows of open grooves (224a, 224b) in two parallel planes. The optical fibers 20a and 20b alternately extend from the different optical fiber cables 22a and 22b. As illustrated in FIG. 16, the terminating optical fibers 20a of the first fiber cable 22a are supported in open grooves 224a provided on the top surface at the perimeter of the ferrule 212, and the terminating optical fibers 20b of the second fiber cable 22b are supported in open grooves 224b provided on the bottom surface at the perimeter of the ferrule 212. The grooves (224a, 224b) can take the same structure as grooves 24 on the surfaces of ferrule halves (12a, 12b) in the embodiment of FIG. 3, or the grooves 24b in the embodiments of FIG. 7.

Each open groove (224a, 224b) completely receives the corresponding optical fiber (20a, 20b). The frame 252 has inside flat sections (250a, 250b) facing the grooves (224a, 224b) when the ferrule 212 is inserted into the frame 252. The flat sections (250a, 250b) completely cover the grooves (224a, 224b). Given that the optical fibers (20a, 20b) are completely retained in the grooves (224a, 224b), the optical fibers (20a, 20b) are positioned with precision in the ferrule halves (12a, 12b) by the grooves (224a, 224b). The position and orientation of the optical fibers (20a, 20b) is set by the location and parallelism of the grooves (224a, 224b). Accordingly, the relative locations (e.g., spacing) of the optical fibers (20a, 20b) in the ferrule halves (12a, 12b) are precisely maintained within the ferrule, e.g., for alignment to fibers in an opposing optical fiber connector (which has a female structure to receive the alignment pins 18). No complementary ferrule or frame would be required to securely and precisely position the fibers within the optical fiber connector 210. Even though the frame 252 does not serve any alignment function or effective support to accurately position the fibers (20a, 20b) in the ferrule 212, however, the frame 252 serves to cover the grooves (224a, 224b) to prevent accidental dislodgment of the optical fibers.

The jackets (27a, 27b) of the fiber cables (22a, 22b) are inserted through openings in the strain relief anchor 256, and are supported on the extension 258. The extension 258 has a stub 260 extending into a central opening 262 in the ferrule 212. Alignment pins 18 are inserted into the space or holes 264 provided in the ferrule 212, extending into holes 266 provided in the strain relief anchor 256. The holes 264 are defined by a split 268 provided at each edge of the ferrule 212. The thickness of the material of at least one prong 270 defining the split is made thinner, to facilitate flexing of the prong 270. A flexure is formed, which defines a compliant structure that clamps the alignment pins to accurately and precisely locate the alignment pins for alignment to another complementary optical fiber connector. The compliant clamping structure makes it possible for the alignment pins to be inserted into the holes 264 with no clearance needed, thus not requiring epoxy to fill any clearance between the holes and the alignment pins.

While the frame 252 is shown to surround the perimeter of the ferrule 212 in the illustrated embodiment, a frame may be structured to cover the grooves (224a, 224b) without surrounding the perimeter of the ferrule 212. For example, a frame may be structured to be a partial ring (e.g., C-shaped) in the end view of FIG. 16 instead of a complete ring (not shown). Alternatively, the frame 252 may be omitted, and the anchor 256 may be provided with two extending flat fingers covering the grooves (224a, 224b) on the top and bottom surface of the ferrule 212 (not shown).

The compliant alignment pin clamping structure is the subject matter of a separate U.S. patent application concurrently filed herewith (attorney docket no. 1125/239). Such application is incorporated by reference as if fully set forth herein.

As were in the case of the previous embodiments, the ferrule 212, frame 252 and/or the anchor 256 may be made of metal and formed by high-throughput stamping and/or extrusion processes. In one embodiment, the ferrule body is made of a metal material, which may be chosen to have high stiffness (e.g., stainless steel), chemical inertness (e.g., titanium), high temperature stability (nickel alloy), low thermal expansion (e.g., Invar), or to match thermal expansion to other materials (e.g., Kovar for matching glass).

It is well within the scope and spirit of the present invention, to provide a ferrule structure that combines the fiber support structure of embodiment of FIGS. 8-13 with the multiple level fiber support structure of embodiment of FIGS. 14-18, to further improve the density of fibers on the ferrule without significantly increasing the footprint or form factor of the ferrule/optical fiber connector. For example, instead of providing grooves (224a, 224b) on the ferrule 212 in the embodiment of FIGS. 14-18, the grooves (224a, 224b) can be replaced with wide flat sections that mate with complementary features on a frame to form two wide flat openings, in each of which two sets of fibers can be retained in an interleaved, tight, side-by-side configuration similar to the embodiment of FIGS. 8-13. This would form a ferrule and optical fiber connector that accommodate 4×12=48 fibers.

While the above described embodiments referred to two separate fiber bundles (e.g., 2 fiber cables of 12 fibers each), it is clear that the inventive high density ferrule structure is also applicable to a single fiber bundle, e.g., 24 fibers of a single bundle supported by two separate row of open grooves (e.g., staggered) or in a single row in an interleaved fashion.

The ferrule in accordance with the present invention overcomes many of the deficiencies of the prior art. The density of optical fibers accommodated in an optical connector is significantly increased (e.g., doubled for a given width or footprint of the ferrule), without significant increase in thickness of the ferrule. By not having any clearance between the grooves in the ferrule and the fibers and alignment pins which would otherwise lead to movements between the parts, the alignment pins and the fibers can be more accurately located relative to each other. The spacing of the fibers and pins can be better maintained under changes in environmental conditions, for example, as the ferrule can accommodate more dimensional variations without affecting specified alignment tolerances. The optical fiber connector thus formed results in low insertion loss and low return loss. The open groove ferrule configuration also allows ease of attaching terminating fiber ends to the ferrules, compared to threading epoxy coated fibers through holes in prior art ferrules. Without using epoxy, the reliability of the optical fiber connector is not affected by any aging/creeping of epoxy material. By selecting appropriate materials for the ferrule, the performance of the optical fiber connector is less sensitive to thermal variations. The open structure of the ferrule lends itself to mass production processes such as stamping and extrusion, which are low cost, high throughput processes.

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

We claim:

1. A ferrule for supporting optical fibers in an optical fiber connector, comprising a body structured with at least an open groove to support terminating end sections of a first set of optical fibers and a second set of optical fibers, wherein the terminating sections of the optical fibers are bare with cladding exposed, wherein the body of the ferrule comprises a first part and a second part opposing each other and maintained in mating relationship to support the terminating end sections of the first and second sets of optical fibers, wherein the terminating end sections of the first set of optical fibers are staggered with respect to the terminating end sections of the second set of optical fibers at the opposing surfaces of the first part and the second part, and wherein the terminating end sections of the first and second sets of optical fibers each has a diameter D, and immediate adjacent terminating end sections of the first set of optical fibers have a centerline spacing of 2D, and immediate adjacent terminating sections of the second set of optical fibers have a centerline spacing of 2D.

2. The ferrule as in claim 1, wherein the ferrule is structured to support the terminating end sections of the first and second sets of optical fibers in at least one plane at the opposing surfaces of the first part and the second part.

3. The ferrule as in claim 2, wherein the first part and the second part of the ferrule correspond to a first ferrule halve and a second ferrule halve, respectively, wherein the first ferrule halve has at least a first open groove supporting the terminating end sections of the first set of optical fibers and the second ferrule halve has at least a second open groove supporting the terminating end sections of the second set of optical fibers, wherein the first open groove and the second groove are defined on the opposing surfaces of the first part and the second part.

4. The ferrule as in claim 3, further comprising a collar clamping on the first and second ferrule halves to maintain the first and second ferrule halves in mating configuration.

5. The ferrule as in claim 2, wherein the ferrule is structured to support the terminating end sections of the first set of optical fibers in a first plane and the terminating end sections of the second set of optical fibers in a second plane different from the first plane.

6. The ferrule as in claim 5, wherein the ferrule comprises a first set of open grooves supporting the terminating end sections of the first set of optical fibers, and a second set of open grooves supporting the terminating end sections of the second set of optical fibers.

7. The ferrule as in claim 6, wherein the ferrule is structured such that the terminating end sections of the first set of optical fibers in the first plane are staggered with respect to the terminating end sections of the second set of optical fibers in the second plane.

8. The ferrule as in claim 6, wherein the ferrule comprises a first ferrule halve and a second ferrule halve, wherein the first ferrule halve comprises the first set of open grooves supporting the terminating end sections of the first set of optical fibers, and the second ferrule halve comprises the second set of open grooves supporting the terminating end sections of the second set of optical fibers.

9. The ferrule as in claim 8, wherein the first set of open grooves are defined on a first surface of the first ferrule halve, and the second set of open grooves are defined on a second surface of the second ferrule halve, wherein the first surface and the second surface are mated when the first ferrule halve and the second ferrule halve are assembled to form the ferrule.

10. The ferrule as in claim 9, wherein the ferrule is structured such that the terminating end sections of the first set of optical fibers in the first plane are staggered with respect to the terminating end sections of the second set of optical fibers in the second plane.

11. The ferrule as in claim 10, wherein the ferrule is structured such that adjacent optical fibers in the first set of open grooves are completely separated by first partitions at the first surface, and adjacent optical fibers in the second set of open grooves are completely separated by second partitions at the second surface, wherein when the first surface and the second surface are mated, each of the first partitions faces a corresponding one of the second set of open grooves and each of the second partitions faces a corresponding one of the first set of open grooves.

12. The ferrule as in claim 11, wherein each of the first partitions includes a first flat portion at the first surface facing the corresponding one of the second set of open grooves, and each of the second partitions includes a second flat portion at the second surface facing the corresponding one of the first set of open grooves, wherein when the first surface and the second surface are mated, each of the first flat portions covers the corresponding one of the second set of open grooves which it faces and each of the second flat portions covers the corresponding one of the first set of open grooves which it faces.

13. The ferrule as in claim 1, wherein the terminating end sections of the first and second sets of optical fibers are staggered alternately in a single plane, such that immediate adjacent terminating end sections of an optical fiber of the first set of optical fibers and an optical fiber of the second set of optical fibers have a centerline spacing of D.

14. A ferrule for supporting optical fibers in an optical fiber connector, comprising a body structured with at least an open groove to support terminating end sections of a first set of optical fibers and a second set of optical fibers, wherein the terminating sections of the optical fibers are bare with cladding exposed, wherein the terminating end sections of the first set of optical fibers are staggered with respect to the terminating end sections of the second set of optical fibers, wherein the body of the ferrule comprises a first set of open grooves supporting the terminating end sections of the first set of optical fibers, and a second set of open grooves supporting the terminating end sections of the second set of optical fibers, wherein the first set of open grooves are defined on a first surface at a perimeter of the body of the ferrule, and the second set of open grooves are defined on a second surface at the perimeter of the body of the ferrule, and wherein no additional ferrule is provided outside the perimeter of the body to oppose the first and second sets of grooves to support the first and second sets of optical fibers.

15. The ferrule as in claim 14, further comprising a frame covering the first and second surfaces.

16. A ferrule for supporting optical fibers in an optical fiber connector, comprising:
a body structured with at least an open groove to support terminating end sections of a first set of optical fibers and a second set of optical fibers, wherein the first set of optical fibers are of a first fiber cable and the second set of optical fibers are of a second fiber cable, wherein the first fiber cable is separate from the second fiber cable, wherein the terminating sections of the optical fibers are bare with cladding exposed, wherein the terminating end sections of the first set of optical fibers are staggered with respect to the terminating end sections of the second set of optical fibers, wherein the ferrule is structured such that the terminating end sections of the first set of optical fibers are staggered with respect to the terminating end sections of the second set of optical fibers alternately in a single plane with longitudinal axis of all the terminating end sections of the first and second sets of optical fibers in the single plane, wherein the ferrule is structured such that the terminating end sections of the first set of optical fibers are interleaved with respect to the terminating end sections of the second set of optical fibers, wherein the terminating end sections of the first and second sets of optical fibers are arranged side-by-side, with the terminating end sections of the first set of optical fibers alternating with the terminating end sections of the second set of optical fibers in the single plane, wherein the ferrule is structured such that the alternating optical fibers are arranged to be touching side-by-side, wherein the ferrule comprises a first ferrule halve and a second ferrule halve, and wherein the first ferrule halve and the second ferrule halve together define a wide flat opening sized to receive the terminating end sections of the first and second sets of optical fibers arranged side-by-side.

17. The ferrule as in claim 16, wherein a first wide flat section is defined on a first surface of the first ferrule halve, and a second wide flat section is defined on a second surface of the second ferrule halve, wherein the first wide flat section and the second wide flat section together define the wide flat opening in the ferrule to accommodate the terminating end sections of the first and second sets of optical fibers.

18. The ferrule as in claim 5, wherein the ferrule is structured such that first plane and the second plane are separate parallel planes.

19. The ferrule as in claim 1, wherein the first set of optical fibers are of a first fiber cable and the second set of optical fibers are of a second fiber cable, wherein the first fiber cable is separate from the second fiber cable.

20. An optical fiber connector, comprising:
the ferrule as claimed in claim 1; and
a housing supporting the ferrule.

21. A ferrule for supporting optical fibers in an optical fiber connector, comprising a body structured with at least an open groove to support terminating end sections of a first set of optical fibers and a second set of optical fibers, wherein the terminating sections of the optical fibers are bare with cladding exposed, wherein the terminating end sections of the first set of optical fibers are staggered with respect to the terminating end sections of the second set of optical fibers, wherein the body of the ferrule comprises a first set of open grooves defined on a first surface supporting the terminating end sections of the first set of optical fibers, and a second set of open grooves defined on a second surface supporting the terminating end sections of the second set of optical fibers, wherein the first surface opposes the second surface, wherein the first set of optical fibers are completely received in the first set of open grooves such that adjacent optical fibers of the first set of open grooves in the first set of grooves are completely separated by first partitions at the first surface, and the second set of optical fibers are completely received in the second set of open grooves such that adjacent optical fibers of the second set of optical fibers in the second set of open grooves are completely separated by second partitions at the second surface, wherein when the first surface and the second surface are mated, each of the first partitions faces a corresponding one of the second set of open grooves and each of the second partitions faces a corresponding one of the first set of open grooves, wherein each of the first partitions includes a first flat portion at the first surface facing the corresponding one of the second set of open grooves, and each of the second partitions includes a second flat portion at the second surface facing the corresponding one of the first set of open grooves, wherein when the first surface and the second surface are mated, each of the first flat portions covers the corresponding one of the second set of open grooves which it faces and each of the second flat portions covers the corresponding one of the first set of open grooves which it faces.

* * * * *